July 12, 1960  H. A. VANDER KAAY  2,944,527
FLOW RATE COMPENSATED VALVE
Filed Aug. 11, 1958
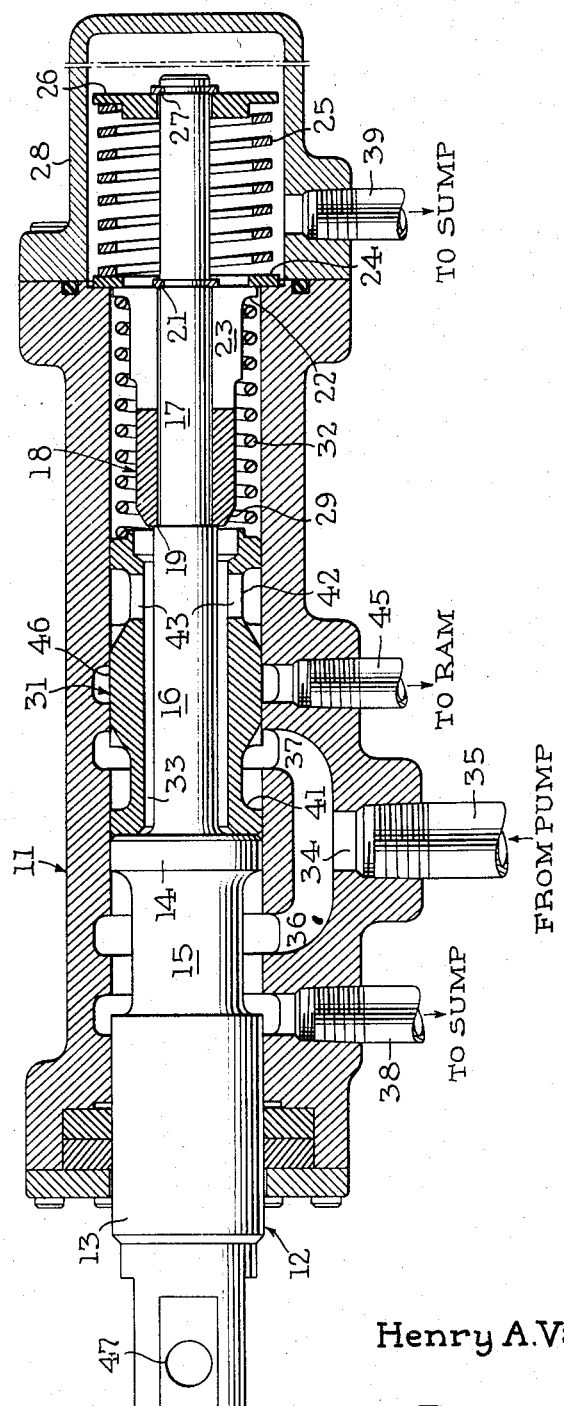
INVENTOR
Henry A. Vander Kaay
BY Dodge and Sons
ATTORNEYS

2,944,527

FLOW RATE COMPENSATED VALVE

Henry A. Vander Kaay, Kalamazoo, Mich., assignor to The New York Air Brake Company, a corporation of New Jersey Filed Aug. 11, 1958, Ser. No. 754,239

2 Claims. (Cl. 121—46.5)

This invention relates to a pressure compensated flow-rate control valve. The flow-rate control valve is particularly useful to control the rate of exhaust flow from a motor, e.g., a single-acting ram such as might be used to raise and lower the load carried by a fork truck, in such a way that heavy loads are lowered at slower rates than are light loads. This permits rapid handling of light loads and permits the same valve to handle heavier loads at lower rates so as to eliminate undesired and possibly damaging shocks when the limit of motion is reached or when lowering movement is terminated.

According to the invention, the flow-rate control valve includes two variable restrictions in series in the exhaust path from a ram; the restriction nearest the sump is subject to a pressure drop which is a function of the rate of flow through it. This pressure drop causes this restriction to increase. Increasing this restriction has the effect of increasing the restriction afforded by the restriction nearest the ram. This causes the pressure head, between the restrictions, to be reduced, which in turn causes the first-named restriction to be reduced. The two restrictions act to create a pressure head between them which varies in direct relation with load on the ram. An increase in the intermediate pressure reduces the rate of flow through the valve, while decrease in this pressure increases the rate of flow. The variable restrictions afforded are controlled by a single valve element which is yieldingly biased in a direction to reduce both restrictions, and is pressure-biased in the opposite direction by the pressure drop through the second restriction, i.e., the one nearest the sump.

The preferred embodiment of the invention will be described having reference to the accompanying drawing, the single figure of which shows in axial section a single-acting control valve embodying the invention.

The control valve includes a housing 11 including a valve bore in which a valve plunger 12 is reciprocable. The plunger includes an end land 13, and a stop land 14, separated by groove 15. A cylindrical extension 16 extends from stop land 14. This extension 16 includes a reduced diameter portion 17, encircled by a valve member 18 confined thereon between shoulder 19 and the snap ring 21. The valve member 18 includes a skirt portion 22 having radial slots 23 therein.

An annular member 24 serves as a spring seat for centering spring 25, the other end of which reacts against annular spring seat 26, confined on the cylindrical extension 16 by a snap ring 27. An end cap 28 completes the closure of this end of the valve bore. Valve member 18 includes a conical seat 29. A tubular valve element 31, fitted in the valve bore, encircles the cylindrical extension 16 between the stop land 14 and the valve seat 29. An annular clearance 33 exists between these parts. A spring 32 biases this valve element toward stop land 14.

The housing includes a supply connection 34, connected with a pump, not shown, by pipe 35. This supply connection includes two branches 36 and 37 which communicate with the valve bore on opposite sides of stop land 14. A sump connection 38 is provided as shown, and is arranged to be overtravelled by end land 13 when the valve plunger 12 is shifted to the right from its illustrated position. A second sump connection 39 is also provided in end cap 28.

Valve element 31 has two grooves 41 and 42 formed in its outer surface. Groove 41 communicates with the pressure supply connection 37 in the illustrated neutral position of the valve. The groove 42 is isolated in the illustrated position of the valve. Radial ports 43 extend from this groove to the annular clearance 33. Spring 32 reacts between valve element 31 and skirt 22 of valve member 18.

A ram connection 45 is provided in housing 11 and communicates with the valve bore therein. This connection is blanked in the illustrated position of the valve plunger 12 by the land 46 on valve element 31 between grooves 41 and 42.

Valve plunger 12 is shown in its normal or neutral position and may be shifted to its exhaust or supply positions by means of an actuating linkage, not shown, which may be connected to the plunger at 47.

Having described the elements of the control valve, its operation will be apparent. In its illustrated neutral position, the ram connection 45 is blanked, thereby trapping fluid in the ram and holding it and the load carried thereby stationary. The pump connection 35 communicates with sump connection 38 through the branch 36 and the groove between lands 13 and 14. Thus the pump is not loaded. When the valve is shifted to the right from its illustrated position, sump connection 38 is blanked by the end land 13, and pump output is supplied to the ram through branch 37, groove 41 and connection 45.

When the valve is shifted to the left from its illustrated position, the pump continues to be unloaded through branch 36, the groove between lands 13 and 14, and sump connection 38. The ram connection 45 is connected to sump through groove 42, radial ports 43, annular clearance space 33, past valve member 18 through slots 23 to the sump connection 39.

This flow to the sump is controlled by two variable restrictions: the one afforded by the registration of groove 42 and connection 45, and the other by the relative positions of the valve member 18 and the end of valve element 31.

The valve element 31 is subject on its left-hand end to the pressure in the annular clearance space 33. On its right-hand end, it is subject in part to this same pressure and in part to the reduced pressure existing in the valve bore around the valve member 18. This latter pressure is reduced by virtue of the flow restriction existing between the valve element 31 and valve member 18. Thus valve element 31 is biased toward the valve member 18. This bias is opposed by spring 32. As the rate of flow increases, the pressure drop through this restriction increases, urging the valve element 31 further toward the valve member 18. This movement of valve element 31, however, restricts the flow from connection 45 to groove 42 and through radial ports 43. This increasing restriction increases the pressure drop between connection 45 and clearance space 33 and decreases the flow rate through the restriction afforded by valve member 18 and valve element 31. The effect of this is to cause an equilibrium pressure to be created in the clearance space 33 which will vary in direct relation to the pressure in the ram connection 45. The higher this equilibrium pressure becomes, the greater the restriction to flow, but the valve parts 31 and 18 will not completely close because the ram connection 45 is increasingly throttled, and possibly completely cut off, to reduce the pressure in clearance space 33 so as to prevent such closure of the flow path.

It is not necessary that the flow-rate controlling valve be included in a control valve. It could be located in the line from the ram to the control valve or it could be in the exhaust connection through which exhaust flow from the ram passes after passing through the control valve.

No limitation to the precise embodiment illustrated is intended except as is expressed in the appended claims.

What is claimed is:

1. A pressure-compensated flow-rate control valve comprising in combination a valve housing having a bore therein; means including a stop closing one end of the bore; means including a valve member closing the other end thereof, said stop and said member being fixed relatively to one another; a tubular valve element reciprocable in said bore between said stop and said valve member and effective to vary the cross-sectional area of the flow path between said valve member and said valve element, said reciprocable valve element having a port formed through its wall, said housing having a motor connection to said bore for variable registration with said port and having an exhaust connection axially spaced from said motor connection toward and beyond said valve member; and yielding means biasing said valve element toward said stop, the pressure drop through said variable flow path acting on said valve element to overcome said bias and to increase the restriction in said flow path and simultaneously to reduce the registering areas of said port and said motor connection and thereby increase the pressure drop between said motor connection and the niterior of said tubular valve element.

2. In a three position control valve for a single-acting ram of the type including a valve housing having a valve bore therein, a valve plunger reciprocable in said bore, said bore having a supply port, a first sump port, a ram port and a second sump port communicating therewith, said plunger having a neutral position in which said supply and said first sump ports are interconnected and said ram port is closed, an exhaust position in which said supply and said first sump ports are interconnected and said ram and said second sump ports are interconnected, and a ram-actuating position in which said supply and said ram ports are interconnected, the improvement which comprises a reduced diameter portion formed on said valve plunger; a valve seat at one end of said portion; a stop at the other end of said portion; a tubular sleeve valve encircling, but radially spaced from, said portion, said sleeve valve being reciprocable between said stop and said valve seat; spring means biasing said sleeve valve toward said stop, said sleeve valve having, on its outer surface, end lands and a center land axially spaced from one another by grooves, the groove adjacent the end land nearer the stop affording the interconnection provided in the ram-actuating position, the other groove having a radial port extending through the sleeve therefrom, that groove, the radial port, the bore of the sleeve valve, the clearance between the end of the sleeve valve and the valve seat affording the interconnection provided in the exhaust position of said control valve, the pressure drop through said clearance urging said sleeve valve toward said seat, and thereby throttling said interconnection by reducing said clearance and simultaneously throttling the flow-path between the ram port and the groove in said interconnection.

References Cited in the file of this patent

UNITED STATES PATENTS

| | | |
|---|---|---|
| 543,448 | Lowe | July 23, 1895 |
| 1,933,852 | Hahn | Nov. 7, 1933 |
| 2,776,056 | Douglas | Jan. 1, 1957 |